(No Model.)
J. GOOD.
SPINDLE AND FLIER.
No. 391,959. Patented Oct. 30, 1888.
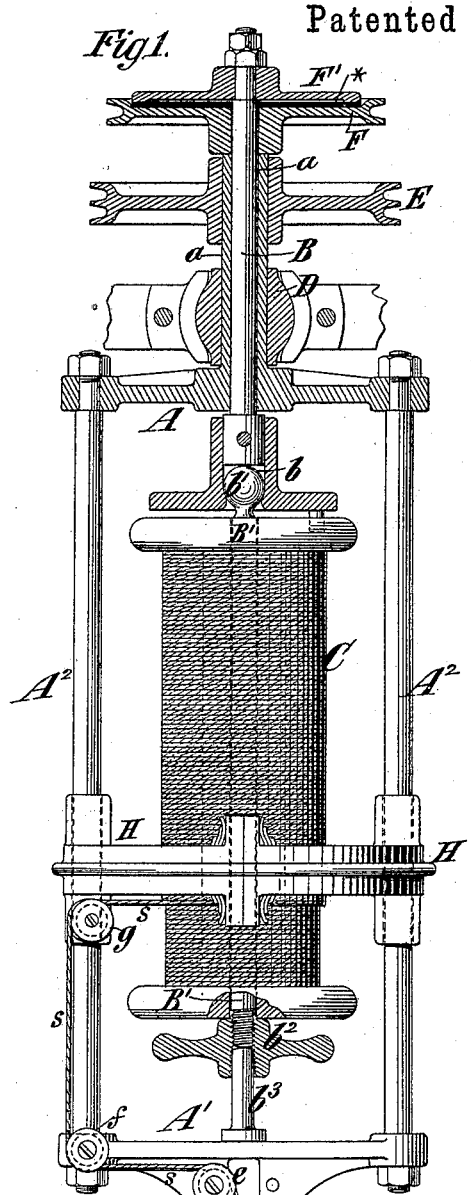
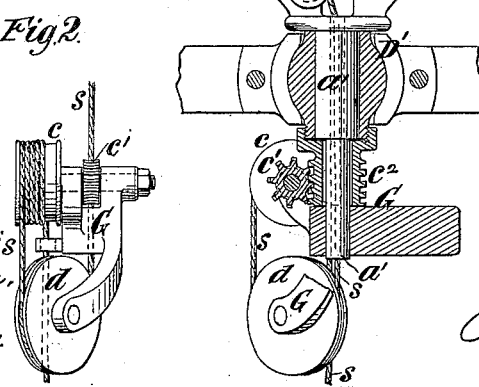

United States Patent Office.

JOHN GOOD, OF BROOKLYN, NEW YORK.

SPINDLE AND FLIER.

SPECIFICATION forming part of Letters Patent No. 391,959, dated October 30, 1888.

Application filed February 26, 1886. Serial No. 193,392. (No model.)

*To all whom it may concern:*

Be it known that I, JOHN GOOD, of the city of Brooklyn, in the county of Kings and State of New York, have invented a new and useful Improvement in Spindles and Fliers, of which the following is a specification.

This improvement relates to spindles and fliers which, as in cordage machinery, are separately driven, the flier being driven at a constant or uniform speed and the spindle being driven at a speed which, through a friction device or drag, is made variable in proportion to the quantity of material on the bobbin.

The object of my improvement is to simplify the application of such means of driving spindles and fliers which are arranged in upright positions; and with this end in view the improvement consists in the combination of the parts of the flier and spindle, their driving-pulleys, and a friction device, as hereinafter described and claimed.

In the accompanying drawings, Figure 1 represents a sectional elevation of a spindle and flier embodying my invention and portions of the frame which support the bearings for the flier-journals, and Fig. 2 is a view in a plane at right angles to Fig. 1 of a portion of the capstan-head.

Similar letters of reference designate corresponding parts in both figures.

A A' designate the two heads of the flier, and $A^2$ the longitudinal bars or rods which connect them.

B B' designate the spindle, which consists of a portion, B, which extends through the tubular journal $a$ at the head A of the flier and a portion, B', jointed thereto, as hereinafter described. Upon the spindle is a bobbin, C. The spindle and flier are upright or vertical, and in this example of my invention the sliver, if the spindle and flier are employed for spinning, or the yarns, if they are employed for forming a strand, are taken from below through the hollow journal $a'$, projecting from the head A' of the flier, and the spindle and flier are driven from the upper ends thereof.

The portion B of the spindle which is journaled in the flier-journal $a$ is here shown as provided at the end within the flier with a socket, $b$, which receives a ball, $b'$, on the spindle portion B', thereby forming a ball-and-socket joint, and the free and lower end of the spindle portion B' has threaded upon it a nut, $b^2$, which also receives a stud, $b^3$, fixed on the flier-head A'. When the nut $b^2$ is unscrewed from the spindle and slipped down on the stud $b^3$, the portion B' of the spindle may be swung outward, so that a bobbin, C, may be placed on or removed from it, and after the spindle portion B' is swung into line with the portion B the nut $b^2$ may screwed onto the end thereof, as shown in the drawings, and serves to connect the spindle portion B' and the stud $b^3$. The whole weight of the bobbin and the spun or twisted material upon it is brought on the spindle through the nut $b^2$.

The journals $a\ a'$ of the flier are fitted to rotate in bearings D D', which are secured to a suitable frame, and to the flier-journal $a$ is secured a pulley, E, which receives a belt or belts, whereby the flier is driven. Loosely fitted on the spindle portion B above the journal $a$, and supported on the upper end of said journal, is a pulley, F, and above the pulley and fast on the spindle is a flange or disk, F', having a friction-face which bears on a corresponding face on the pulley, one or both faces being faced with leather or other material, *, to increase the friction between them. These two faces constitute the friction device or drag through which the spindle receives motion from its pulley F. The spindle-pulley F is driven at such constant speed that the number of its revolutions will be less than the number of those of the flier, and yet greater than the greatest number of revolutions ever to be made by the spindle.

It will be understood that as the whole weight of the spindle and bobbin and the material on the bobbin are brought upon the disk F' the increasing weight of the material on the bobbin will increase the friction between the said disk and the upper face of the pulley F, and the slip between the said disk and face will diminish, so that the proper tension will be maintained on the material being wound on the bobbin, while the difference in speed between the spindle and flier will be correspondingly decreased.

The flier-journal $a'$ carries a stock or body, G, in which are journaled a capstan-barrel, $c$, and a pulley, $d$. The sliver or yarns $s$, which are to be twisted, pass first to and around the barrel $c$, and thence over the pulley $d$ and through the hollow journal $a'$ and over the yarn-guides $e\,f\,g$, and thence to the bobbin C. The guides $e\,f$ are carried by the flier; but the guide $g$, which is a traverse-guide, is carried by a ring-carrier, H, which is composed of semicircular sections sliding upon the rods or bars $A^2$. The construction and operation of this traverse-guide carrier are fully described in my United States Letters Patent, No. 317,116, dated May 5, 1885.

The shaft of the capstan-barrel $c$ has upon it a worm-wheel, $c'$, which gears into a stationary worm or screw, $c^2$, and receives a rotary motion on its axis as it is revolved about the worm or screw. As here represented, the worm or screw $c^2$ is formed upon a cap, which is secured upon the journal-bearing $D'$, and is always maintained concentric therewith. By this simple combination of parts motion is transmitted to the capstan-barrel, the axis of which is transverse to the axis of the spindle and flier-journal.

By the hereinabove-described combination of the parts of the upright flier and spindle, their driving-pulleys, and the friction device between the spindle and its pulley great simplicity of construction is obtained, and the whole of the driving apparatus is brought together above the flier.

What I claim as my invention, and desire to secure by Letters Patent, is—

1. The combination, with an upright flier and a central upright spindle contained therein and passing through the upper journal thereof, of a pulley on the upper flier-journal, a pulley loose on the said spindle above the said journal and provided with a friction-surface, and a friction-disk fast upon the spindle, all substantially as herein described, whereby the whole weight of the spindle and its disk and the material upon the spindle is supported by said disk and the spindle-pulley above the flier, substantially as herein described.

2. The combination, with the upright flier and the central upright spindle contained therein and passing through the upper journal, A, thereof, of a pulley, E, on the upper flier-journal, a pulley, F, loose on the spindle and supported on the upper end of the flier-journal and provided with a friction surface, and a friction-disk, F', fast upon the spindle above said pulley F, all substantially as herein described, whereby the whole weight of the spindle and its disk and the material upon the spindle is transmitted through the said disk to said pulley F and supported on the upper side of the flier-journal, as herein described.

JOHN GOOD.

Witnesses:
FREDK. HAYNES,
C. HALL.